May 3, 1966     O. D. BROGDEN     3,249,370

SAFETY ATTACHMENT FOR A HOSE

Filed Dec. 31, 1964     2 Sheets-Sheet 1

OREN D. BROGDEN
INVENTOR
HUEBNER & WORREL
ATTORNEYS
BY Richard M. Worrel

OREN D. BROGDEN
INVENTOR
HUEBNER & WORREL
ATTORNEYS

United States Patent Office 3,249,370
Patented May 3, 1966

3,249,370
SAFETY ATTACHMENT FOR A HOSE
Oren D. Brogden, P.O. Box 952, Project City, Calif.
Filed Dec. 31, 1964, Ser. No. 425,377
4 Claims. (Cl. 285—81)

This is a continuation in part of application Serial No. 216,197, filed August 10, 1962, now abandoned. The present invention relates to a safety attachment for a hose and more particularly to such an attachment for spanning a coupling in the hose which precludes inadvertent separation of the coupling.

A hazard exists in the operation of pneumatically-operated industrial tools such as grinders, chippers, and drills and on mucking machines employed in mining operations and the like. The couplings employed for connecting such tools with air supply hoses frequently become inadvertently disengaged by breakage or from vibrations originating in the tools. The air supply hoses to such tools frequently must resist pressures of approximately 100 pounds per square inch. When inadvertent separation of a hose occurs, the open end thereof whiplashes uncontrollably by the reaction of the jet of escaping air. Such problem is particularly onerous in confined areas such as mines and the like where it is nearly impossible for workmen to escape to a position of safety or to reach the main air shut-off valve supplying the hose. The same problem is encountered in hydraulic hose couplings.

Conventional safety attachments for high pressure hose couplings have not been as successful as desired. Primarily, such conventional attachments are not easily removable for fast changes in instances of tool replacement, equipment failure or hose breakage. Furthermore, they require special tools for installing the attachment which are not usually conveniently available in an emergency.

Therefore, it is an object of the present invention to provide a safety attachment for a hose having a coupling therein which provides an improved tension connection across the coupling to preclude inadvertent separation of the coupling.

Another object is to provide such a safety attachment which may be quickly and conveniently removed after initial installation on a hose and re-installed without tools.

Another object is to provide a safety attachment across a hose coupling which is adapted to prevent inadvertent relative movement of portions of the coupling with resultant loosening thereof.

Another object is to provide a safety attachment for a hose which can be easily installed on existing hose couplings without alteration or modification of the hose or of the coupling.

Other objects and advantages of the present invention will become more fully apparent in the following description in the specification.

Figure 1:
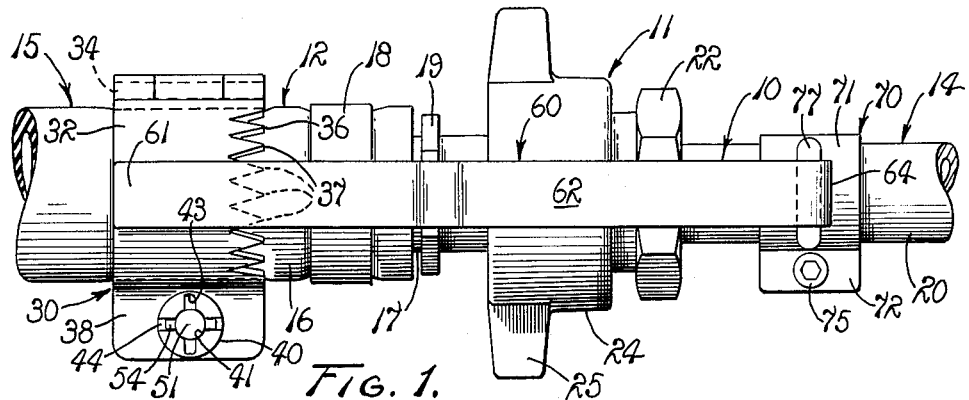
FIG. 1 is a top plan view of the safety attachment of the present invention shown mounted in spanning relation to a hose coupling.

Referring more particularly to the drawings, the safety attachment of the present invention is indicated generally at 10 in spanning relation to a coupling 11 between a pair of separable segments 12 and 14 of a high pressure pneumatic supply line 15. The segment 12 is represented by a flexible supply hose 16 which is rigidly mounted on a serrated nipple 17 by a clamp 18 in the conventional manner. The opposite end of the hose, not shown, is connected to a source of air or other fluid under pressure. The nipple 17 is screw-threadably received within a housing 19 which extends inwardly of the coupling 11.

The segment 14 of the high pressure supply line 15 represents in the described embodiment of the present invention an inlet supply conduit 20 of a pneumatically powered tool such as a grinder, chipper, or the like, not shown. The conduit 20 is screw-threadably connected to a bushing 22 also extended inwardly of the coupling 11. An enlarged nut 24 having a pair of radially extended diametrically opposed protuberances 25 thereon is interposed the bushings 19 and 22 to complete connection of the opposite segments of the line by relative rotation on the bushings. While the conduit 20 is representative of an inlet conduit for the tool to be powered, it is readily apparent that such segment of the line could be represented by a flexible hose similar to the segment 12. The described structure constitutes illustrative environment for the device of the present invention.

The safety attachment 10 of the present invention includes a first circular anchor member or clamp 30 which has a pair of opposite semi-circular side members 32 and 33 hinged for relative swinging movement about a common hinge pintle 34. The side members provide a continuous gripping edge 36 having a plurality of teeth 37 axially extended therefrom which are radially inwardly bent to present a diameter somewhat less than the diameter of the clamp when closed. The clamp also includes a pair of radially outwardly extended mating ears 38 and 39 formed by continuations of the side members 32 and 33, respectively. The ear 38 has a boss 40 extended outwardly therefrom which has a bore 41 therethrough aligned with a similar bore 42 in the ear 38. A diametrically disposed slot 43 is provided through the boss and the ear 38 in right-angular relation to a notch 44 formed in the outer face of the boss. The ear 39 of the clamp provides a bore 46 which is aligned with the bore 41 through the boss 40 when the clamp is closed about the hose 16, as shown.

In order rigidly to constrain the clamp about the hose 16, a locking mechanism 50 is associated with the ears 38 and 39. The locking mechanism includes an elongated locking rod 51 which is extended through the bore 46 in the ear 39 and provides a hexagon head end 52 and an opposite latching end 53 having a drive pin 54 diametrically extended therethrough. A compression spring 56 is mounted about the pin between the head 52 and the ear 39. The rod 51 is readily rotatable within the bores with the pin 43 being of a size readily to slide through the slot 43 therein. With the rod extended through the boss, the spring urges the pin 54 into seating engagement with the notch 44 upon 90° rotation of the pin.

An elongated substantially flat rigid safety strap 60 provides an end 61 rigidly mounted on the side member 32 of the clamp by suitable fastening means such as riveting, welding or the like. The strap also includes a raised intermediate portion 62 and a return bent opposite end 63. The return bent end 63 is extended toward but terminates short of the clamp 30 in spaced substantially parallel relation to the intermediate portion 62 of the strap to define a curved bight portion 64.

A second anchor member or clamp 70 is formed of a continuous strap 71 having a pair of mating radially outwardly extended tabs 72 and 73. The clamp 70 is rigidly mounted about the conduit 20 by a cap screw 75 extended through the tabs of the clamp. A rigid eye member 77 is borne by the clamp 70 in circumferentially spaced relation to the tabs in longitudinally aligned relation with the safety strap 60 of the first clamp 30.

Second form

Figure 6:
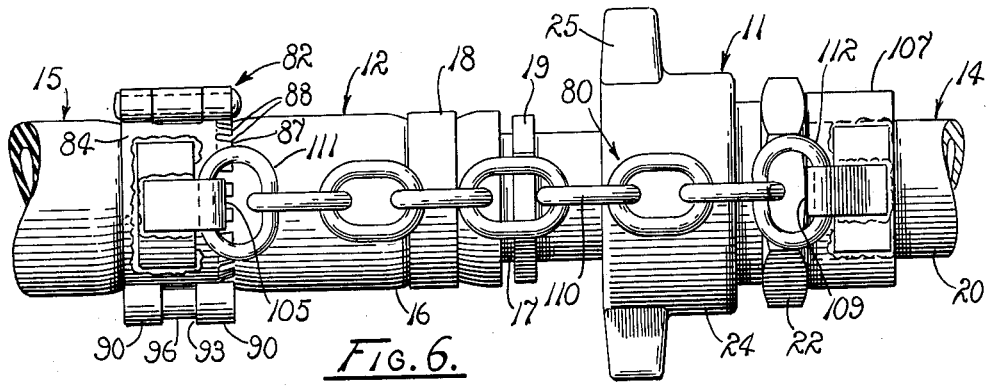
FIG. 6 is a top plan view of a second form of safety attachment embodying the principles of the present invention shown mounted in spanning relation to the hose coupling of the preceding figures.
Figure 7:
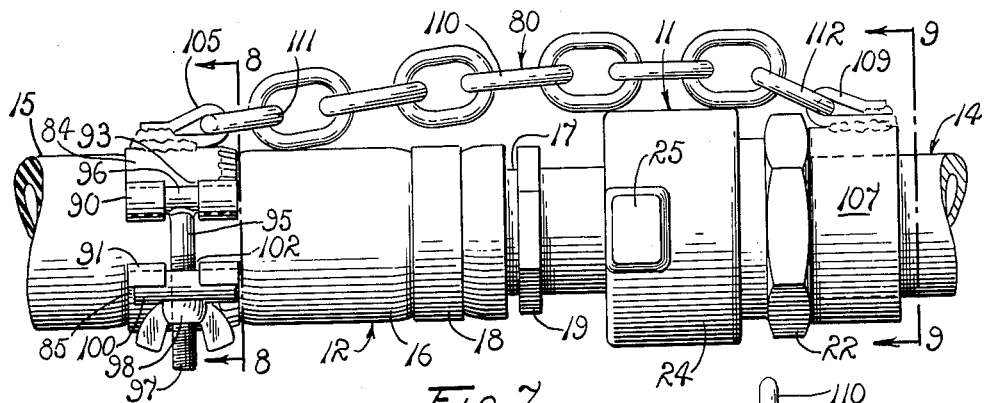
FIG. 7 is a side elevation of the safety attachment of FIG. 6.
Figure 8:
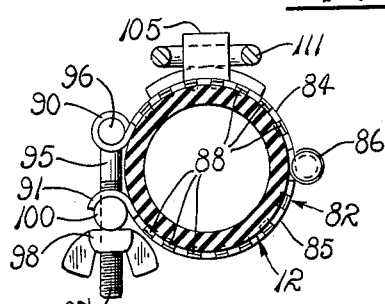
FIG. 8 is a transverse vertical section of a clamping member of the second form of safety attachment taken on line 8—8 of FIG. 7.
Figure 9:
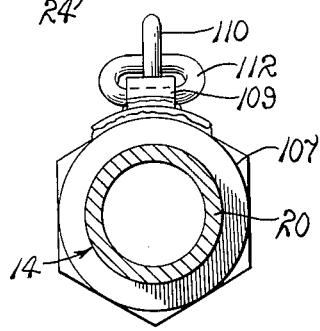
FIG. 9 is a transverse vertical section of an anchor ring of the second form of safety attachment taken on line 9—9 of FIG. 7.

A second form of the safety attachment embodying the principles of the present invention is indicated generally by the reference numeral 80 in FIGS. 6 through 9. As best shown in FIGS. 6 and 7, the second form of safety attachment is adapted to be disposed in spanning relation between the segments 12 and 14 of the coupling 11 in a manner similar to the safety attachment 10 of the first form of the invention. The second form of safety attachment is specifically intended for installations which experience an excessive amount of vibration.

The safety attachment 80 includes a circular anchor member or clamp 82 which provides a pair of opposite semi-circular side members 84 and 85 hinged for relative swinging movement about a common hinge pintle 86. As in the first form of the invention, the side members provide a continuous gripping edge 87 having a plurality of teeth 88 axially extended therefrom which are radially inwardly bent to present a diameter at their tips somewhat less than the diameter of the clamp when closed. The clamp also includes a pair of radially outwardly extended latch mounting ears 90 and 91 formed by continuations of the side members 84 and 85, respectively. The ear 90 is substantially circular in cross section and provides a central slot 93. An elongated fastener bolt 95 is extended through the slot 93 for rotation therethrough about a T-head portion 96 rotatably disposed within the ear 90. The fastener bolt includes an opposite screw-threaded end 97 which mounts a wing nut 98 for constraining an elongated cylindrical locking rod 100 upon the bolt in sliding relation between the head and wing nut. The ear 91 is semi-circular in cross section and includes a central slot 102 in aligned relation with the slot 93 of the ear 90. The slot 102 is thereby adapted to receive the fastener bolt 95 to permit positioning of the locking rod 100 within the ear 91. With such arrangement, the clamp 82 may be tightly clamped about the flexible supply hose 16 and quickly and easily detached therefrom when desired by appropriate manipulation of the bolt and wing nut. The clamp 82 further includes a rigid looped band member 105 which is rigidly secured, as by welding or the like, to the outer periphery of the side member 84.

A continuous circular second anchor member or ring 107 of case hardened steel or the like is disposed about the conduit 20 in freely axially sliding rotatable relation. A rigid looped band 109 is secured to the outer periphery thereof by welding or the like in a manner similar to the looped band 105 of the clamp 82. An elongated safety chain 110 provides opposite end links 111 and 112 which are individually extended through the looped bands 105 and 109 flexibly to interconnect the clamp 82 and the anchor ring 107.

Operation

Figure 2:
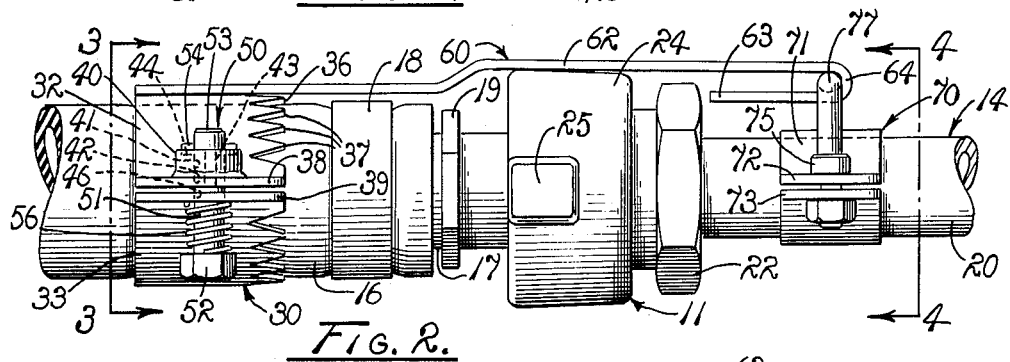
FIG. 2 is a side elevation of the safety attachment of FIG. 1.
Figure 3:
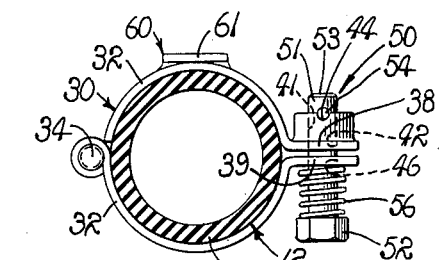
FIG. 3 is a transverse vertical section of a clamping member of the safety attachment taken on line 3—3 of FIG. 2.
Figure 4:
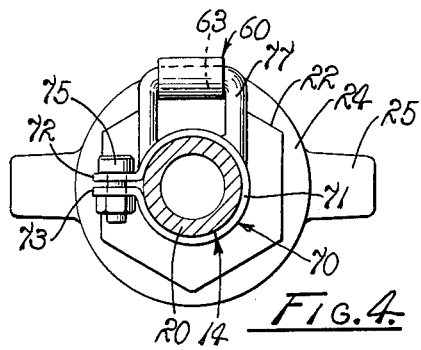
FIG. 4 is a transverse vertical section of another clamping member of the safety attachment of the present invention taken on line 4—4 of FIG. 2.
Figure 5:
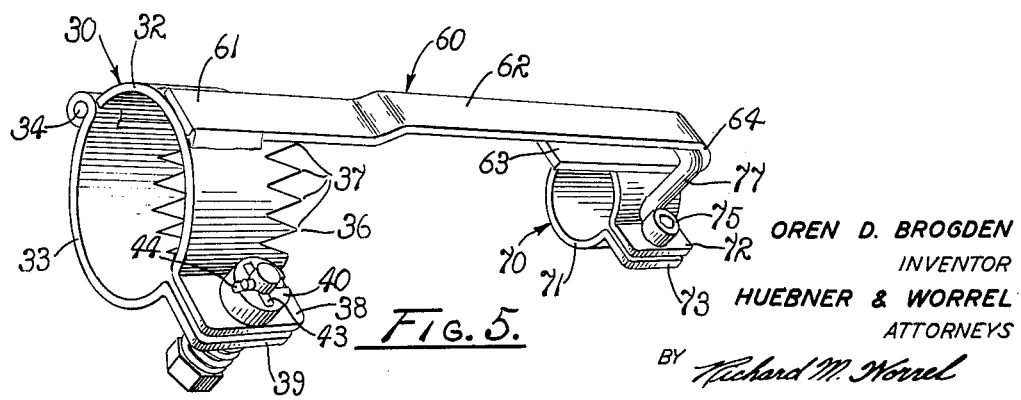
FIG. 5 is a perspective of the safety attachment shown in an assembled condition but removed from the hose coupling of the preceding figures.

The operation of the described embodiments of the subject invention is believed to be clearly apparent and is briefly summarized at this point. During assembly of the coupling 11, the nut 24 is rotatably tightened to provide a fluid-tight connection between the opposite segments 12 and 14 of the high pressure air supply line 15. During such rotation, the protuberances 25 on the nut describe a predetermined path of travel circumferentially about the coupling. The second clamp 70 is rigidly mounted about the conduit 20 of the tool in predetermined spaced relation from the bushing 22 of the coupling. The return bent end 63 of the safety strap 60 is slid through the eye member 77 of the second clamp and disposed in a position with the bight portion of the strap intimately embracing the eye member 77. During such connection, the first clamp 30 is disposed in an open position with the pin 51 carried by the ear 39 of the side member 33 of the clamp. In such position, the side member 32 is fitted over the hose 15 and the ears 38 and 39 of the clamp manually drawn toward engagement by pivoting the side member 33 about the pintle 34 of the hinge. Such movement slides the pin 54 through the slot 43 in the ear 38 and the boss 40 and outwardly therefrom so that upon 90° rotation of the rod 51, the pin 43 is indexed to a position to engage the notch 44 in the boss. With such arrangement, the clamp 30 is dependably positioned on the hose 15 with the teeth 37 thereof indenting the hose dependably to preclude axial movement of the clamp toward the coupling. Conversely, the hose is precluded axial movement outwardly of the coupling with the connection between the second clamp 70 and the return bent end and the bight portion 63 of the safety strap precluding axially outward displacement of the conduit 20 of the tool. It is readily apparent that the safety strap 60 dependably precludes any relative outward axial movement of the clamps. As best shown in FIG. 2, when the safety attachment of the present invention is rigidly constrained at its ends by the clamps 30 and 70, the intermediate portion 62 thereof overlies the nut 24 of the coupling 11. In such position, the strap is disposed within the predetermined path of travel of the protuberances 25 thereof which limits rotation of the nut to preclude separation of the coupling from vibration originating in the tool.

After initial assembly of the second clamping nut 70 on the conduit 20 of the tool, the safety attachment of the present invention can be readily removed and re-assembled on the hose 15 without tools. In such instance, the head 52 of the locking rod 51 is pressed inwardly against the spring 56 and is rotated 90° again to align the cross pin 54 with the slot 43 in the boss and in the ear 38 of the clamp. The side member 33 of the clamp is then opened by pivotal swinging movement about the pintle 34 of the hinge and the clamp is swung upwardly or outwardly of the hose 15 with the safety strap 60 by pivotal movement of the bight portion 64 of the strap about the eye member 77. The return bent end 63 is then slid outwardly of the eye member completely to disengage the safety attachment from the coupling. The nut 24 of the coupling is then free to be rotated to separate the hose 15 from the conduit 20. It is readily apparent that upon reassembly of the nut 24 of the coupling, the safety attachment of the present invention can be readily reassembled in the above described manner without the use of tools.

Operation of the second form

The operation of the second form of the safety attachment 80 is functionally similar to that previously described for the first form. However, during initial assembly, the bushing 22 is required to be removed from the conduit 20 to permit sliding of the anchor ring 107 onto the conduit. The bushing 22 is then replaced on the conduit by the usual screw-threaded connection. Where excessive vibration of a great magnitude is expected, the bushing is preferably welded to the conduit in order positively to preclude any opportunity for loosening and separation therefrom. As before, the coupling 11 is then assembled by rotation of the nut 24 to provide a fluid tight connection between the opposite segments 12 and 14 of the high pressure air supply line 15.

After connection of the coupling 11, the clamp 82 is disposed adjacent to the air supply hose 16 and the safety chain 110 tensioned between the clamp and the ring 107 with the ring abutting the bushing 22. The clamp 82 is then in an open position so as to be easily fitted over the hose and the ears 90 and 91 are drawn toward each other to close the side members 84 and 85 about the hose. The fastener bolt 95 is then pivoted about its T-head portion 96 within the ear 90 for movement through the slot 93 and into the slot 102 in the ear 91. The wing nut 98 is advanced toward the ears to carry the locking rod 100 into the ear 91 to draw the side members 84 and 85 tightly about the hose.

With such arrangement, the clamp 82 is dependably positioned on the hose with the teeth 88 thereof indenting the hose 16 to preclude any axial movement of the clamp toward the coupling 11. Furthermore, the hose is precluded axial movement outwardly of the coupling by the connection of the safety chain 110 with the anchor ring 107 which abuts the bushing 22. The safety chain also overlies the nut 24 of the coupling in the path of travel of the protuberances 25 which limits rotation of the nut 24 to preclude separation of the coupling. It is recognized that the anchor ring will be permitted a limited amount of rotation relative to the conduit depending upon the tension of the safety chain. However, such rotation is minimal. Accordingly, the solid circular construction of the anchor ring 107 is not affected by the excessive vibrations transmitted through the rigid conduit 20. These vibrations are substantially isolated from the clamp 82 by the flexible hose 15 so that the safety attachment of the second form retains the quick detachable features of the first form but provides a more rigid structure at the point of greatest vibration virtually to eliminate any fatigue failure of the components of the attachment from vibration.

From the foregoing, it is readily apparent that the safety attachment of both forms of the present invention provides an improved safety lock between a pair of separable hose segments. The attachment can be quickly and conveniently assembled and disassembled in spanning relation to the coupling and dependably precludes inadvertent separation of the segments or rotation of the coupling member. Also, after initial assembly of the safety attachment, it can then be disassembled and reassembled across the coupling without tools.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a high pressure conduit having a pair of separable segments adapted to be joined by a coupling having a rotatable nut portion, said nut portion providing a protuberance thereon which traces a predetermined path of travel during said rotation; a safety attachment comprising a first clamp and a second clamp; locking means individually releasably constraining said clamps tightly about said segments of the conduit on opposite sides of the coupling; an elongated safety strap of rigid material having an end rigidly mounted on said first clamp, an opposite free end and an intermediate portion, said free end of the strap including a return bent portion extended toward but terminating short of said first clamp in spaced substantially parallel relation to the intermediate portion of the strap; and means borne by said second clamp to receive and releasably to hold said return bent portion of the strap on said second clamp so that said strap bridges said coupling and limits outward axial displacement of the clamps, said intermediate portion of the strap overlying said nut portion of the coupling within said path of travel in interfering relation with the protuberance on the nut portion to preclude rotation and separation of the coupling.

2. A safety attachment for a high pressure conduit having a pair of separable segments adapted to be joned by a coupling having a rotatable nut portion, said nut portion providing a protuberance thereon adapted to trace a predetermined path of travel during said rotation; said attachment comprising a first substantially circular clamp having a pair of hinged side members providing substantially radially outwardly extended mating ear portions; a locking member extended through said ear portions releasably to tighten said clamp about said segment of the conduit adjacent to one side of the coupling; an elongated safety strap of rigid material having an end rigidly mounted on said first clamp and an opposite free end, said free end of the strap including a return bent portion extended toward but terminating short of said first clamp in spaced substantially parallel relation to the strap; a second continuous substantially circular clamp having a pair of opposite end tabs substantially radially outwardly extended therefrom; locking means extended through said end tabs to tighten said second clamp about said segment of the conduit adjacent to the opposite side of the coupling; and a rigid eye member borne by said second clamp in circumferentially spaced relation to said end tabs to receive and releasably to hold said return bent portion of the strap so that said strap bridges said coupling and limits outward axial displacement of the clamps, said strap overlying said nut portion of the coupling intermediate its ends within said path of travel in interfering relation with the protuberance on the nut portion to preclude rotation and separation of the coupling.

3. A safety attachment for a high pressure conduit having a pair of separable segments adapted to be joined by a coupling having a rotatable nut portion, said nut portion providing a protuberance thereon tracing a predetermined path of travel during said rotation; said attachment comprising a first substantially circular clamp having a pair of hinged side members providing a continuous axially radially inwardly extended toothed gripping edge, and substantially radially outwardly extended mating ear portions; a spring biased locking bolt carried by one of said ear portions and extendable through said mating ear portions in locking relation therewith to tighten said clamp about said segment of the conduit adjacent to one side of the coupling with said toothed edge indenting the conduit to restrict movement of the clamp toward the coupling; an elongated safety strap of rigid material having an end rigidly mounted on said first clamp and an opposite free end, said free end of the strap including a return bent portion extended toward but terminating short of said first clamp in spaced substantially parallel relation to the strap; a second continuous substantially circular clamp having a pair of opposite end tabs substantially radially outwardly extended therefrom; a locking bolt extended through said end tabs to tighten said second clamp about said segment of the conduit adjacent to the side of the coupling opposite to the side of the coupling which is adjacent to said first clamp; and a rigid eye member borne by said second clamp in circumferentially spaced relation to said end tabs to receive and releasably to hold said return bent portion of the strap so that said strap bridges said coupling and limits outward axial displacement of the clamps, said strap overlying said nut portion of the coupling intermediate its ends within said path of travel in interfering relation with the protuberance on the nut portion to preclude rotation and separation of the coupling.

4. In combination with a high pressure conduit having a pair of separable segments joined by a rigid coupling having a rotatable connecting member, said connecting member having at least one protuberance thereon which traces a predetermined path of travel during said rotation; a safety attachment comprising a pair of anchor members; means mounting said anchor members on said segments of the conduit on opposite sides of and closely adjacent the ends of the coupling and restraining said members against axial movement toward each other, at least one of said anchor members having means for releasing the same from its associated conduit segment; an elongated flexible tension member; and means mounting said tension member onthe anchor members to extend substantially axially therebetween in interconnecting relation whereby to limit outward axail displacement and separation of the anchor members relative to each other, said tension member extending outwardly of and over said connecting member in interfering relation to said path of travel of said protuberance to preclude rotation and inadvertent separation of the coupling, said tension member being of a length substantially equal to the distance between said anchor members whereby to remain in interfering relation to said path in all relative positions of said conduit segments.

References Cited by the Examiner

UNITED STATES PATENTS

| | | | |
|---|---|---|---|
| 600,872 | 3/1898 | Hommel | 285—114 |
| 766,961 | 8/1904 | Morris | 285—114 X |
| 1,191,219 | 7/1916 | Pelter | 285—253 |
| 1,426,086 | 8/1922 | Lowrey | 285—114 |
| 1,558,878 | 10/1925 | Hitchock | 285—114 |
| 1,586,904 | 6/1926 | Kuhn. | |
| 2,915,800 | 12/1959 | Graef | 24—279 |
| 2,963,305 | 12/1960 | Miller | 285—114 |
| 3,079,660 | 3/1963 | Kaplan | 24—279 |

FOREIGN PATENTS

| | | |
|---|---|---|
| 241,568 | 3/1960 | Australia. |
| 616,577 | 10/1926 | France. |
| 526,319 | 6/1937 | Germany. |
| 159,741 | 1/1933 | Switzerland. |

CARL W. TOMLIN, *Primary Examiner.*

R. GIANGIORGI, *Assistant Examiner.*